US005438664A

United States Patent [19]

Kashio

[11] Patent Number: 5,438,664

[45] Date of Patent: Aug. 1, 1995

[54] METHOD AND APPARATUS FOR PRODUCING SLIPS OF VARIABLE LENGTH AND HAVING USER-DEFINED WORD NAMES AND ASSOCIATED WORD DATA THEREON

[75] Inventor: Toshio Kashio, Tokyo, Japan

[73] Assignee: Casio Computer Co., Ltd., Tokyo, Japan

[21] Appl. No.: 126,136

[22] Filed: Sep. 23, 1993

Related U.S. Application Data

[63] Continuation of Ser. No. 869,826, Apr. 15, 1992, abandoned, which is a continuation of Ser. No. 360,210, Jun. 1, 1989, abandoned.

[30] Foreign Application Priority Data

| | | | |
|---|---|---|---|
| Jul. 14, 1988 | [JP] | Japan | 63-175415 |
| Jul. 14, 1988 | [JP] | Japan | 63-175434 |
| Jul. 14, 1988 | [JP] | Japan | 63-175435 |
| Jul. 14, 1988 | [JP] | Japan | 63-175436 |
| Jul. 14, 1988 | [JP] | Japan | 63-175437 |
| Jul. 14, 1988 | [JP] | Japan | 63-175438 |

[51] Int. Cl.[6] .................. G06F 3/00

[52] U.S. Cl. .................. 364/419.1; 364/401; 364/405; 364/709.01; 364/710.01; 364/710.07; 364/710.1; 364/710.11; 364/710.13; 364/DIG. 1; 364/DIG. 2; 395/700; 395/800

[58] Field of Search .................. 364/401, 405, 710.1, 364/710.11, 710.13, 709.01, 710.01, 710.07; 395/500, 800, 700, 275

[56] References Cited

U.S. PATENT DOCUMENTS

| | | | |
|---|---|---|---|
| 3,822,378 | 7/1974 | Kashio | 364/779 |
| 4,003,031 | 1/1977 | Kashio . | |
| 4,031,515 | 6/1977 | Kashio . | |
| 4,032,900 | 6/1977 | Kashio . | |
| 4,034,350 | 7/1977 | Kashio . | |
| 4,064,553 | 12/1977 | Kashio . | |
| 4,079,234 | 3/1978 | Kashio . | |
| 4,103,334 | 7/1978 | Kashio . | |
| 4,133,041 | 1/1979 | Kashio . | |
| 4,145,753 | 3/1979 | Kashio . | |
| 4,187,547 | 2/1980 | Olander, Jr. et al. | 364/710 |

(List continued on next page.)

FOREIGN PATENT DOCUMENTS 0209907 7/1986 European Pat. Off. .

OTHER PUBLICATIONS

8204 IBM Systems Journal, vol. 21 (1982) No. 3, N.Y. OPAS: An Office Procedure Automation System, V. Y. Lum.

8070 Communications of the Association for Computing Machinery, Vo. 25 (1982) Jul., No. 7, N.Y. D. Tsichritzis.

*Primary Examiner*—Ken S. Kim

*Attorney, Agent, or Firm*—Frishauf, Holtz, Goodman & Woodward

[57] ABSTRACT

A slip producing apparatus and method for producing a slip having a variable number of word names and respectively corresponding word data, wherein a plurality of slip types and a variable arbitrary number of word names corresponding to each slip type are stored in advance in a word name storage device; an input device is provided for inputting data designating the slip type and for sequentially inputting word data respectively corresponding to the variable number of word names of the designated slip type; and the inputted word data is stored in a word data storage device. The designating slip type stored in the word name storage device is outputted, the word names are read out from the word name storage device and the respectively corresponding word data is read out from the word data storage device, and an elongated slip of the designated slip type is outputted in which the word names and the respectively corresponding word data are arranged in units of rows, the number of rows on the elongated slip being a function of the number of stored word names corresponding to the outputted designated slip type.

6 Claims, 17 Drawing Sheets

U.S. PATENT DOCUMENTS 4,203,152 5/1980 Watson et al. .
4,301,511 11/1981 Shimizu et al. .................... 364/709
4,374,425 2/1983 Fuka .................................. 364/709
4,408,292 10/1983 Nakatani et al. .................. 364/405
4,484,277 11/1984 Uesugi ............................... 364/405
4,503,503 3/1985 Suzuki .
4,508,962 4/1985 Yamasaki ........................... 235/378
4,553,219 11/1985 Ueno .................................. 364/705
4,604,696 8/1986 Suganuma et al. ................ 364/401
4,677,551 6/1987 Suganuma .......................... 364/401
4,750,120 6/1988 Takahashi .......................... 364/405
4,811,219 3/1989 Touji et al. ........................ 364/405
4,847,762 7/1989 Suzuki ................................ 364/405
4,862,386 8/1989 Axelrod et al. .................... 364/518
5,018,066 5/1991 Yagi ................................... 364/405
5,081,579 1/1992 Komai et al. ...................... 364/405

| | SLIP TYPE NO. | SLIP TYPE NAME | OUR COMPANY'S NAME | NUMBER OF ITEMS |
|---|---|---|---|---|
| TITLE AREA KY | 120 | SALES SLIP | △△ ---- CORP. | 3 |

| | WORD NO. | WORD CONTENT | WORD NAME | LABEL |
|---|---|---|---|---|
| HEADER AREA HD | 01 | c1 | DATE | |
| | 02 | a | SLIP NO. | |
| | 03 | a | | |
| | 04 | b03 : A | PURCHASER | |
| | 05 | a | | |
| | 06 | b05 : B | BELONGING SECTION | |
| | 07 | a | | |
| | 08 | b07 : C | PERSON - IN - CHARGE | |
| | 09 | e | TOTAL AMOUNT | ¥ |
| ITEM AREA AT | 10 | I | | |
| | 11 | a | | |
| | 12 | b11 : D | PRODUCT | |
| | 13 | a | QUANTITY | |
| | 14 | a | UNIT PRICE | ¥ |
| | 15 | 13 x 14 | AMOUNT | ¥ |
| | 16 | d (ACCOUNTS RECEIVABLE CODE) | | |
| | 17 | d (SALES CODE) | | |
| | 18 | 05～07 | | |
| | | E | | |

22

F I G. 3

| | SLIP TYPE NO. | WORD NO. | | | | | | |
|---|---|---|---|---|---|---|---|---|
| HOST COMPUTER | 112 | 01 | 02 | 03 | 04 | 05 | ------ | 14 |
| INPUT TERMINAL UNIT | 120 | 01 | 02 | 09 | 17 | 03 | ------ | 14 |

CORRESPONDENCE TABLE X

FIG. 4A

| | SLIP TYPE NO. | WORD NO. | | | | | | |
|---|---|---|---|---|---|---|---|---|
| HOST COMPUTER | 123 | 01 | 02 | 03 | 04 | 05 | ------ | 14 |
| INPUT TERMINAL UNIT | 130 | 01 | 02 | 05 | 07 | 03 | ------ | 14 |

CORRESPONDENCE TABLE Y

FIG. 4B

FIG. 12A
FIG. 12B
FIG. 12C
FIG. 12D
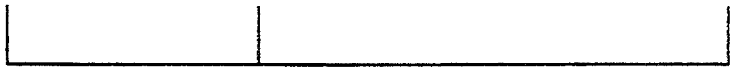
FIG. 12E
FIG. 12F
FIG. 12G
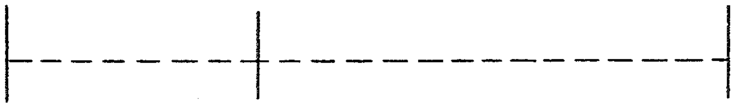
FIG. 12H
FIG. 12I

METHOD AND APPARATUS FOR PRODUCING SLIPS OF VARIABLE LENGTH AND HAVING USER-DEFINED WORD NAMES AND ASSOCIATED WORD DATA THEREON

This application is a continuation of application Ser. No. 07/869,826, filed Apr. 15, 1992, now abandoned which is a continuation of Ser. No. 07/360,210, filed Jun. 1, 1989, now abandoned.

BACKGROUND OF THE INVENTION

1. Field of the Invention

The present invention relates to a slip data processing apparatus.

2. Description of the Related Art

Business firms use a large number of types of business slips or forms, including, for example, order-acceptance slips, sales slips, purchase slips, and transfer slips of traveling-expense statement of accounts, credit slips, and the like. Throughout the following description, such slips, forms, records etc. are referred to as "slips" for ease of designation.

In the prior art, when slip data are printed by using an slip data processing apparatus and the like, a slip data print program is started in response to a command input from a keyboard, and the slip data are sequentially printed under control of the print program.

Further, when slip data is input by using an slip data processing apparatus, a slip data input program is started in response to a command input from the keyboard, and the slip data are sequentially input under control of the slip data input program.

However, in order to print the slip data in various formats, corresponding print programs for the slip data must be prepared. Furthermore, the slip data print programs are usually coded by using a program language. For example, the print positions of data and the slip format must be described by using a program language, thereby requiring much skilled labor. Accordingly, it is difficult for a general user to prepare and modify such programs.

Further, in order to adapt the slip data processing apparatus to various slip input formats, the corresponding slip input programs must be prepared by using a program language. Accordingly, it is difficult for a general user to prepare and modify such programs.

SUMMARY OF THE INVENTION

The present invention includes various aspect, some of which are summarized below.

According to a first aspect of the invention, a slip data processing method for producing a slip which includes a record formed of units of word data and word name comprises inputting word data; storing input word data; storing word names corresponding to respective word data forming one record of the slip; reading as output data for given lines of the slip; a unit including word name and word data corresponding to the word name; and printing an elongated slip in which said readout units follow each other in the longitudinal direction of the slip.

According to a second aspect of the invention, a slip data processing apparatus for producing a slip which includes a record formed of units of word data and word name comprises input means for inputting at least word data; data storage means for storing word data input by said input means; word name storage means for storing word names corresponding to respective word data forming one record of the slip; output means for outputting, as output data for given lines of the slip, a unit including word name and word data corresponding to the word name; and means response to the output data of said output means for printing an elongated slip in which the word name and the word data of given lines of said output data are arranged in a predetermined manner, and in which said units follow each other in the longitudinal direction of the slip.

According to the present invention, a longitudinal slip can be output in a common form independent of the number of words constituting the one record, i.e., the number of words constituting the slip data.

Furthermore, whether the word data should be output or not can be designated by the presence or absence of the word name set in the word data storage means. The word data is used not only for designating a name of a word data to be output therewith, but for selectively outputting the word data. As a result, a user can easily designate the output forms of various slips by setting or not setting the word name. Therefore, a slip data processing apparatus can be provided which requires no slip output program described by a program language, and which has much flexibility and applicability.

According to a third aspect of the invention, a slip data processing method comprises inputting at least word data; storing setting data for defining an operation corresponding to each of said word data; reading said stored setting data, waiting for the input of the word data if the read-out setting data indicates an input operation commanding to input the word data, and performing an operation to generate word data if the read-out setting data indicates another operation; and storing at least one record data comprising a plurality of word data, each word data comprising any of said generated word data and said input word data.

According to a fourth aspect of the present invention, a slip data processing apparatus comprises input means for inputting at least word data; data storage means for storing at least one record data comprising a plurality of word data; word content storage means for storing setting data for defining an operation corresponding to each of said word data; and processing means for sequentially reading the setting data from said word content storage means, for waiting for the input of the word data if the read-out setting data indicates an input operation commanding to input the word data from said input means, for performing an operation to generate word data if the read-out setting data indicates another operation, and for writing, into said data storage means, the word data generated by said performing means or the word data input from said input means.

Accordingly, by simply setting the setting data such as an input word and a process word in the word content storage means corresponding to the respective word data, a slip data processing apparatus according to the aspect of the present invention can input various word data in various slip forms. Therefore, a slip data processing apparatus according to the aspect of the present invention can be provided which requires no slip processing program which is described by a program language and which has much applicability.

Other aspects of the present invention described in the present specification are included within the scope of the present invention.

BRIEF DESCRIPTION OF THE DRAWINGS

FIG. 3 is a view showing set data stored in word setting memory 22;

FIGS. 4A and 4B are each views showing corresponding data stored in word correspondence memory 28;

FIGS. 12A, 12B, 12C, 12D, 12E, 12F, 12G, 12H, and 12I are each views showing a slip form of one line to be printed in the print operation in FIG. 11;

DETAILED DESCRIPTION OF THE PREFERRED EMBODIMENTS

Figure 1:
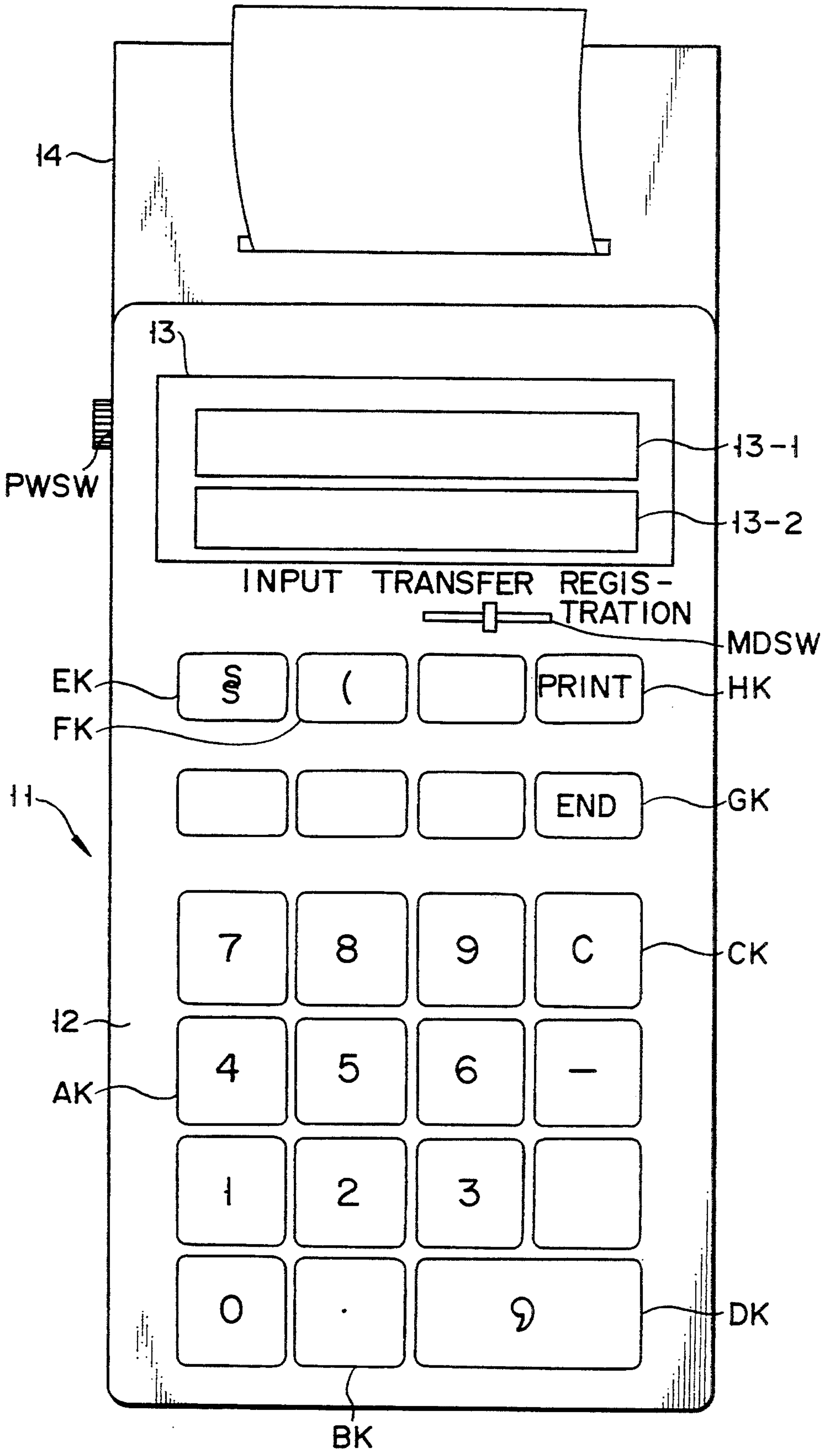
FIG. 1 is an outer view of a compact slip data processing apparatus for inputting slip data.

FIG. 1 is an outer view showing a hand-held slip data processing apparatus provided with a printer, Main body 11 is provided with keyboard 12 and display panel 13 at its front portion, and power switch PWSW at one of its side portions. Mode switch MDSW on keyboard 12 selects an input mode, a transfer mode, and a registration mode corresponding to its switching positions. The "input mode" designates an input of slip data. The "transfer mode" designates a transfer of the input slip data to an external unit (a host computer). Further, the "registration mode" designates a registration in a predetermined memory of set data defining processing contents corresponding to the respective words constituting the slip data.

Further, keyboard 12 is provided with numeric keys AK, decimal point key BK, clear key CK, word delimiter key DK which is activated each time input of one word data is completed, slip designation key EK, record delimiter key FK which is activated each time input of one record data is completed, input completion key GK which is activated each time input of all the data amount to one slip is completed, and print key HK for printing the input data in a slip form manner.

Display panel 13 comprises a word label display section 13-1 which dot-matrix displays the word name in character or in numeric form, and a word data display section 13-2 which displays the word data. Further, printer 14 prints data in a predetermined slip form. Further, terminal main body 11 is provided with, at its bottom, a transceiver section for transmitting and receiving data to or from the external unit by using an optical signal.

Figure 2:
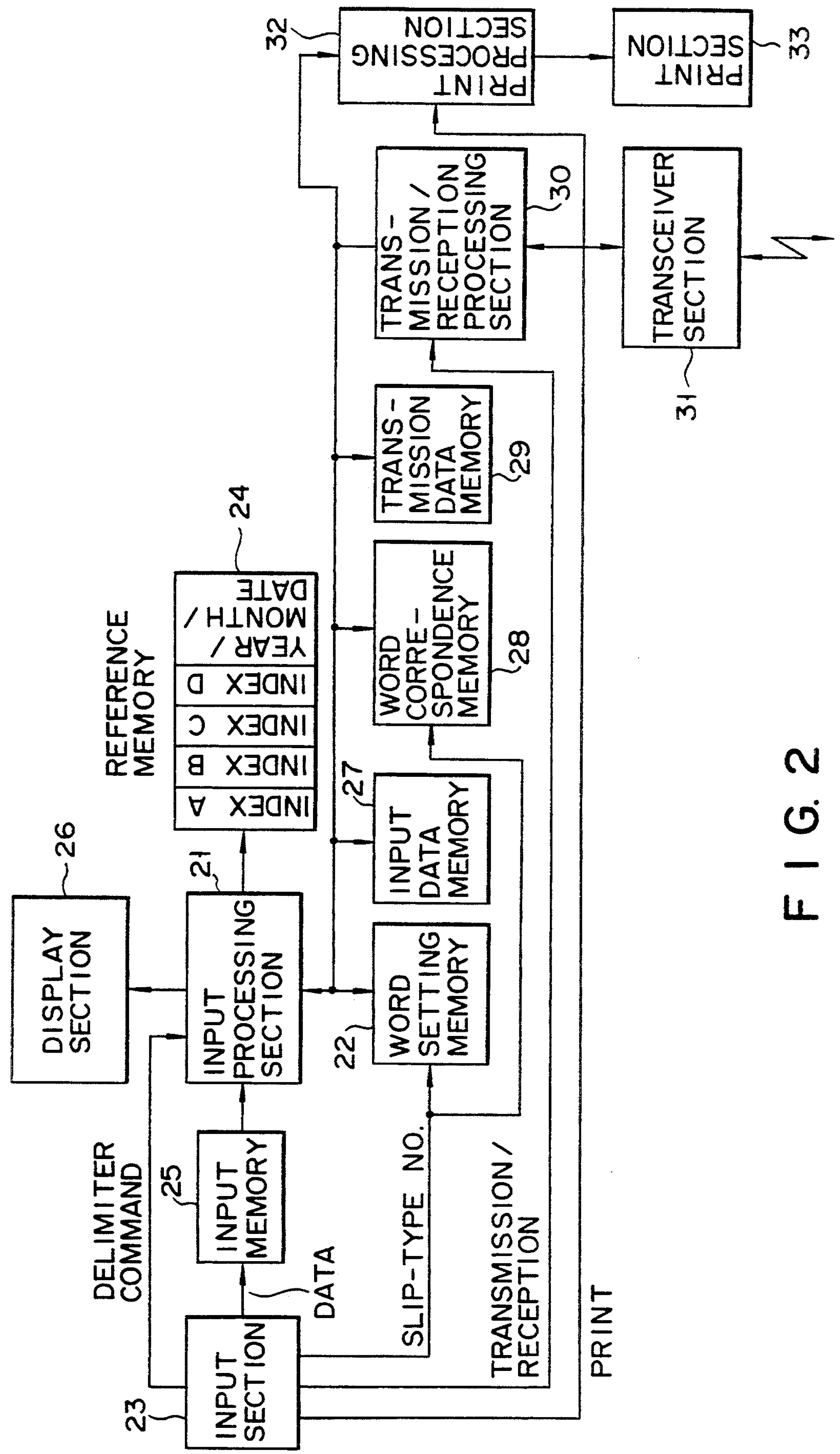
FIG. 2 is a circuit diagram of the slip data processing apparatus.

FIG. 2 is a view showing a circuit arrangement of the slip data processing apparatus.

Input processing section 21 sequentially reads the set data defining processing contents corresponding to the respective words constituting a predetermined slip which has preliminarily been stored in word setting memory 22. Prior to the reading, a slip No. (a slip number indicating a type of slip) is input from input section 23 to word setting memory 22. Thus, word setting memory 22 outputs the set data corresponding to the input slip number. When the set data read out from word setting memory 22 designates the input of data from input section 23, input processing section 21 waits for the input of the data. On the contrary, when the set data designates another processing word, input processing section 21 generates the word data by using reference memory 24 and the like. In the data input wait state, upon receiving a delimiter command from input section 23 in response to the activation of word delimiter key DK, input processing section 21 takes in, as one word data, the data which have been input by input section 23 and sequentially stored in input memory 25. Input processing section 21 displays the input data taken from input memory 25 or the data generated by using reference memory 24, on display section 26 and writes the data into input data memory 27.

Further, upon completing the input of the word data amount to a single slip into input data memory 27, input processing section 21 reads predetermined word data to be sent from input data memory 27 by referring to word correspondence memory 28, and stores the readout word data in transmission data memory 29.

Reference memory 24 is provided with index tables A, B, C, and D. In this embodiment, index table A stores, in a form of character data, various purchaser names corresponding to purchaser codes. Index table B stores, in a form of character data, various belonging section names corresponding to belonging section codes. Furthermore, index table C stores, in a form of character data, various item names corresponding to item codes. Further, reference memory 24 stores console data such as current date data (year, month, and date), slip No, and the like.

Transceiver section 30 starts in response to a transmission/reception command from input section 23 issued by mode switch MDSW being set to the transfer mode. More specifically, section 30 reads the contents of transmission data memory 29, and transmits, from transceiver section 31 and by using a photoelectric signal, the contents to the external unit such as a host computer. Further, section 30 sets mode switch MDSW to the registration mode to receive and registers the setting data, and the word correspondence data from the external unit in word setting memory 22 and word correspondence memory 28, respectively.

Print processing section 32 controls a print processing in accordance with a slip print program which has preliminarily been stored. If print key HK is activated prior to the input of data, input processing section 21 activates print processing section 32 in response to input completion key GK from input section 23, and prints the word data which have been sequentially read out from input data memory 27 on a recording sheet set in printing section 33.

FIG. 3 shows various setting data stored in word setting memory 22. A memory area for a single slip of word setting memory 22 comprises title area KY, header area HD, and item area AT. Data to be set in the respective areas can arbitrarily be written by a user depending on slip-type No. Title area KY stores, as a title data, a slip-type No., a slip-type name, and our company's name. Header area HD and item area AT store word contents defining processing contents of word, word names, and label, corresponding to the respective words constituting one record.

The setting data defining the word contents comprises an input word and other processing words, and are defined as follows.

"a" indicates an input word and defines that the word data be input from input section 23.

"b" indicates an index word and defines that the word data be generated by using any one of index tables A, B, C, and D stored in reference memory 24.

"cl" indicates a date word and defines that date data be read out from reference memory 24 and a word data be prepared.

"d" indicates a constant word and defines that code of accounts receivable code, sales code and the like which follows "d", be directly input as the word data.

"e" indicates a totalization word and defines that item amounts be totalized and a word data be generated indicating the totalized result.

"x" indicates a calculation word and defines that an arithmetic operation such as unit price x quantity and the like be performed and a word data be generated indicating the calculation result.

"~" indicates a link word which indicates that a plurality of word data designated by word Nos. are combined to issue single word data. For example, belonging section code and a clerk code are combined to produce single word data.

"I" and "E" defines the start and completion of an item, respectively. Note that "A", "B", "C", and "D" designates index tables A, B, C, and D stored in reference memory 24.

FIGS. 4A and 4B show a partial structure of word correspondence memory 28. Word correspondence memory 28 stores a plurality of correspondence tables X, Y, and the like corresponding to the slip-type numbers. Correspondence table X designates a correspondence table between a slip represented by slip-type number "120" designated by an slip data processing apparatus and a slip represented by slip-type number "112" designated by a host computer. Further, correspondence table Y designates a correspondence table between a slip represented by slip-type number "130" designated by an slip data processing apparatus and a slip represented by "123" designated by a host computer. Each correspondence table X, Y stores correspondence data (word number) for making a record format of one slip stored in input data memory 27 correspond to a record format of the corresponding slip processed at a host computer. For example, if the record format of one slip processed at the host computer comprises 14 words designated by the word No. "01", "02", . . . , and "14", word numbers for designating the word data stored in input data memory 27 corresponding to the respective words are stored in tables X, Y, and the like.

Operation

Assume now that the word contents of a slip are defined in word setting memory 22 as shown in FIG. 3.

First, in order to designate a slip shown in FIG. 3, numeric keys AK are activated to input slip-type No. "120", and slip designation key EK is activated.

Figure 5A:
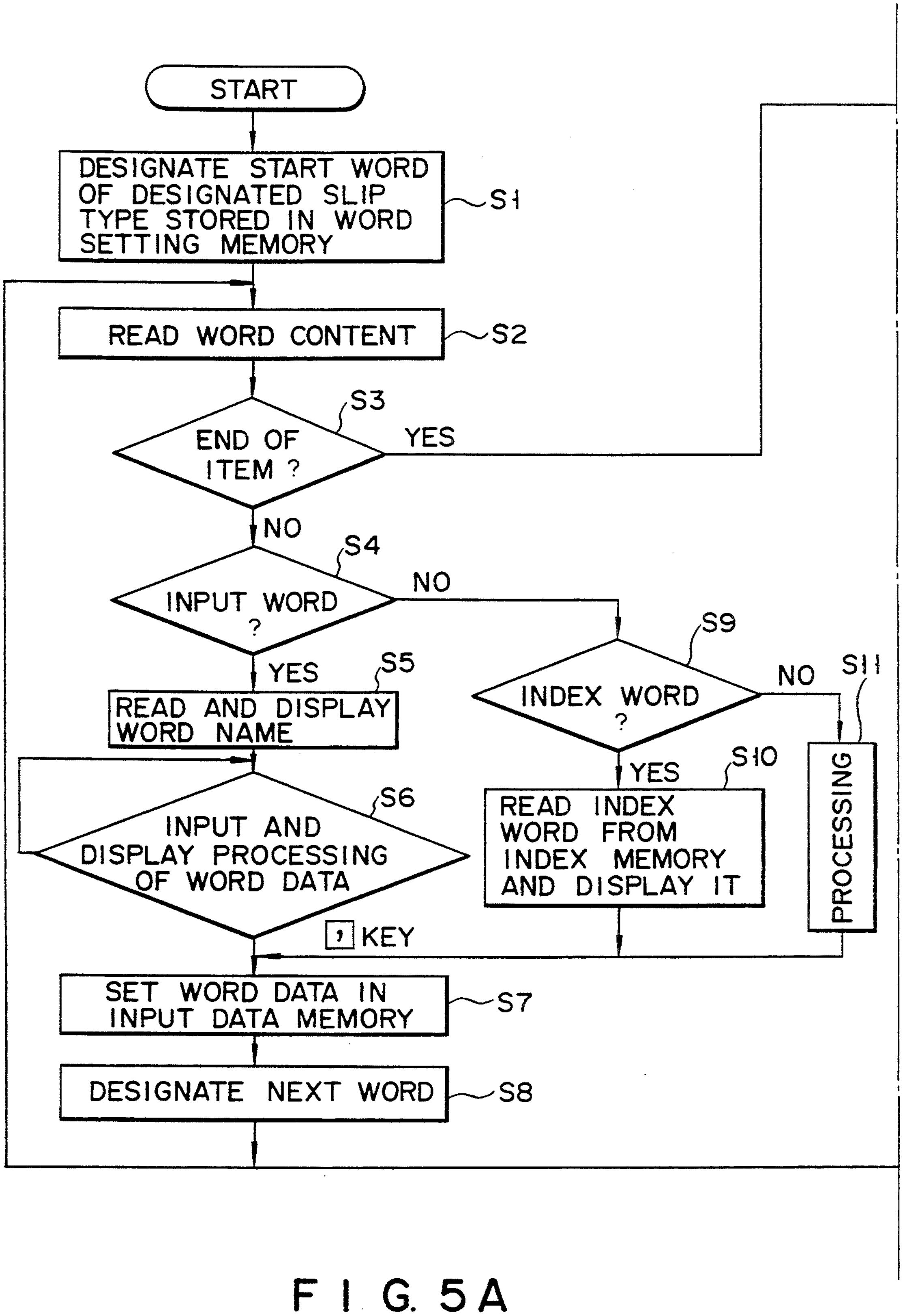
FIGS. 5A and 5B together are flowcharts showing an input processing operation of the slip data processing apparatus.
Figure 5B:
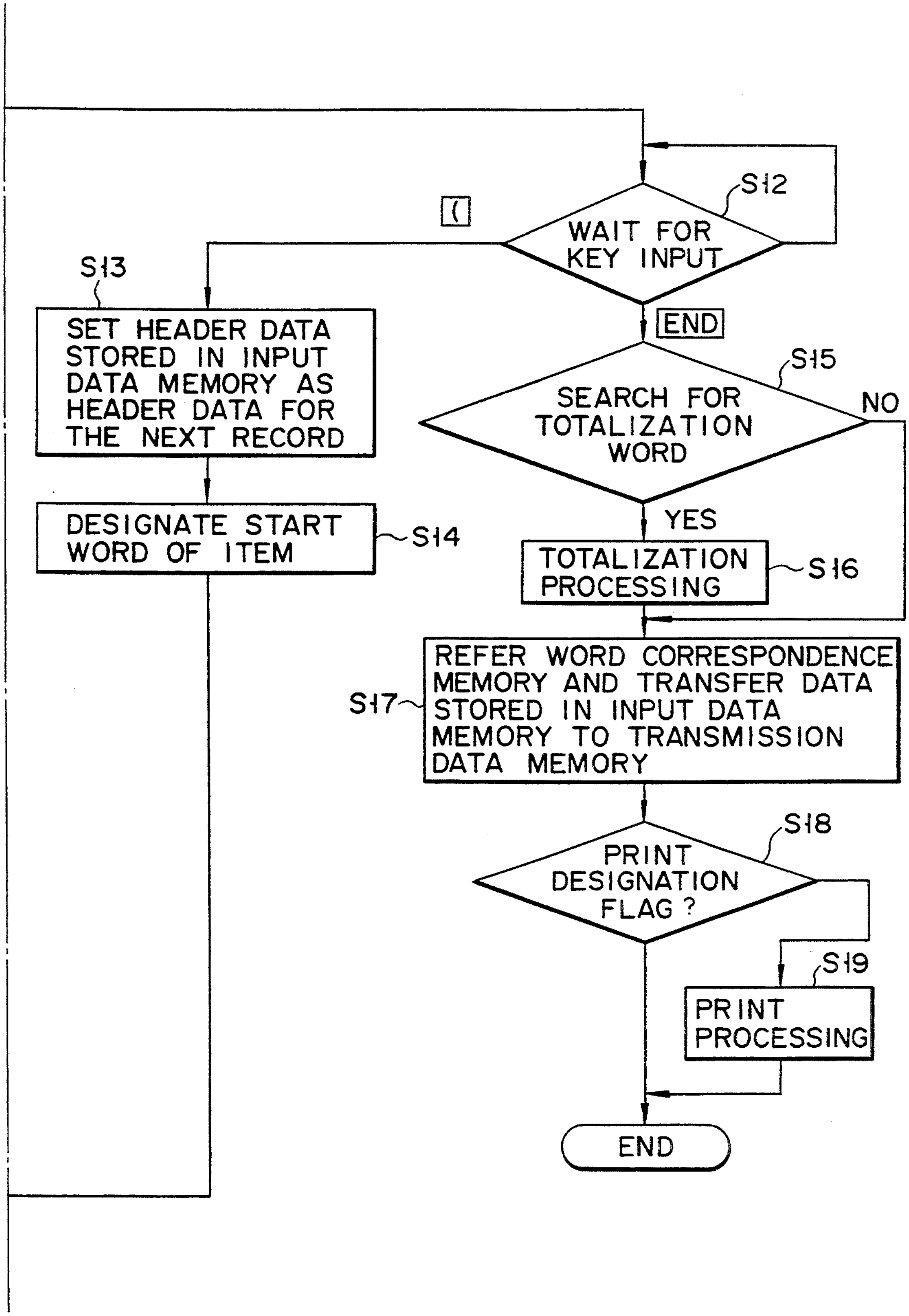

Thus, the input processing program of slip data is operated, and input processing section 21 operates in accordance with a flowchart shown in FIGS. 5A and 5B.

First, section 21 retrieves, from word setting memory 22, a slip type corresponding to an input slip number, designates an address of a start word of a corresponding data of the retrieved slip type (step S1), and reads the word content designated by the address (step S2). Then, section 21 checks, in step S3, whether the read-out word content is an item completion word "E" or not. Since the item completion word "E" is not read out first, section 21 advances to step S4 to check whether the read-out content is input word "a" or some other processing word. Since slip number "120" is designated in this example, the start word thereof, i.e., section 21 reads, as a process word, date word "cl" from header area HD designated by word number "01". Then, section 21 advances to step S9 to check whether the process word is an index word or a date word. If the index word or the date word is determined, section 21 performs, in step S10, a processing in accordance with index word "b" or the date word. If a word other than the index word or the date word is determined, section 21 advances to step S11 to perform a processing corresponding to the word. Since date word "cl" is read out, section 21 read the current date from reference memory 24. Then, section 21 advances to step S7 to write the the date data read out from reference memory 24 into input data memory 27 as a word data whose word number is "01". Then, section 21 advances to step S8 to designate an address of a next word stored in word setting memory 22, and then returns to step S2.

Thus, section 21 reads input word "a" from word setting memory 22, determines input word "a" in step S4, and advances to step S5 to read a word name corresponding to input word "a" and causes display section 26 to display the word name on word label display section 13-1. Then, section 21 waits, in step S6, for a word data from input section 23. At this time, word name "slip No." corresponding to word number "02" read out from word setting memory 22 is displayed on word label display section 13-1. Therefore, an operator verifies the word name and inputs a slip number by numeric keys AK of input section 23, and then activates word delimiter key DK. In response to word delimiter key DK, input processing section 21 reads a word data stored in input memory 25 and displays it on word data display section 13-2 of display section 26. Then, section 21 advances to step S7 to write the word data read out from input memory 25 into input data memory 27 as a data whose word number is "02". Thereafter, section 21 advances to step S8 to designate the next word and then returns to step S2.

Then, section 21 reads, in step S2, input word "a" corresponding to word number "03" from word setting memory 22, and displays the corresponding word name in step S5. Since the word name corresponding to word number "03" is not stored, section 21 reads and displays the word name corresponding to the next word, i.e., "purchaser". Then, as described above, section 21 waits for an input of word data in step S6. When a purchaser code is input in step S6, section 21 advances to step S7 to write the input purchaser code into input data memory 27 as a data whose word number is "03". Then, section 21 advances to step S8 to designate the next word designation, and then returns to step S2.

In step S2, section 21 reads a word content (index word) whose word number is "04" from word setting memory 22. In step S9, section 21 determines the read out index word and advances to step S10 to perform a corresponding index processing. Index word "b03:A" defines to read word data having word number "03" (in this case, purchaser code), read a corresponding word data (for example, xxx company) from index table A stored in reference memory 24, and display it on data display section 13-2 of display section 26. Then, section 21 advances to step S7 to write the word data in input data memory 27 as a word data having word number "04". Then, section 21 advances to step S8 to designate the next word and then returns to step S2.

Similarly, section 21 sequentially reads the word content from word setting memory 22, checks whether the read out word content is an input word or other process words, and writes word data in input data memory 27 while executing a corresponding processing. When section 21 detects "e" (totalization word) as the word content, section 21 skips steps S11 and S7, and executes step S8. Upon completing a header processing, section 21 executes an item processing.

Upon reading, from word setting memory 22, word "e" indicating that items constituting one record have been completely processed, section 21 detects this in step S3 it and then advances to step S12 to wait for the next key input. Since all the items for one record have been processed, an operator activates record delimiter key FK. Then, section 21 advances to step S13 to copy a header data stored in input data memory 27 in a predetermined position of memory 27 as a header data for the next record. Then, section 21 advances to step S14 to designate a start word of the corresponding record item, and then returns to step S2. As a result, a similar operation is performed for the items constituting one record.

When all the records to be processed are input, an operator activates completion key GK. In response to completion key GK, section 21 advances from step S12 to step S15 to determine whether the totalization word "e" is stored in word setting memory 22. In this case, section 21 searches the word contents stored in word setting memory 22 from the start word corresponding to the designated slip type. Since totalization word "e" is stored in a position corresponding to word number "09", section 21 advances to step S16 to perform a totalization operation. Totalization word "e" defines to totalize an amount of each record. Thus, section 21 sequentially reads the amount of each record from input data memory 27, sums them, and writes the total amount in a position of input data memory 27 corresponding to word number "09".

Upon completion of inputting word data amount to one slip, section 21 advances to step S17 to refer to word correspondence memory 28, read predetermined word data from input data memory 27, and store the read-out data in transmission data memory 29. More specifically, section 21 selects a table corresponding to a designated slip type (in this case table X corresponding to slip-type number "120") from tables X, Y . . . stored in word correspondence memory 28. Then, section 21 sequentially reads, from corresponding table X, word numbers "01", "02", "09" of an slip data processing apparatus. Among the word data constituting one slip corresponding to the designated slip type and stored in input data memory 27, section 21 reads word data designated by the word numbers sequentially read out from corresponding table X, and stores them in transmission data memory 29. As described above, by storing word data read out from input data memory 27 in transmission data memory 29 while referring to word correspondence memory 28, an arrangement of word data stored in memory 29 coincides with a record format adopted in a host computer.

Figure 6A:
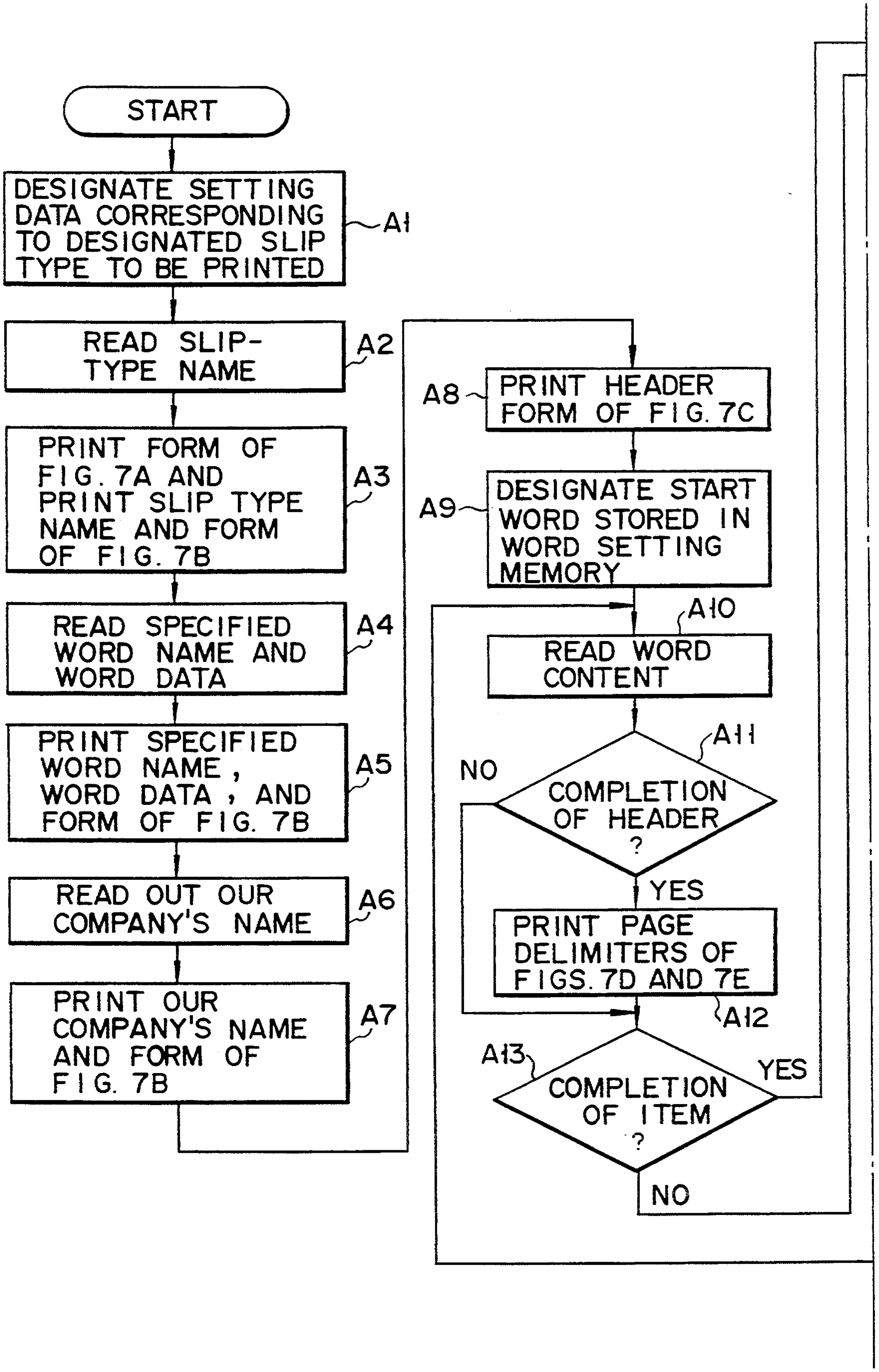
FIGS. 6A and 6B together are flowcharts showing a print processing operation of the slip data processing apparatus.
Figure 6B:
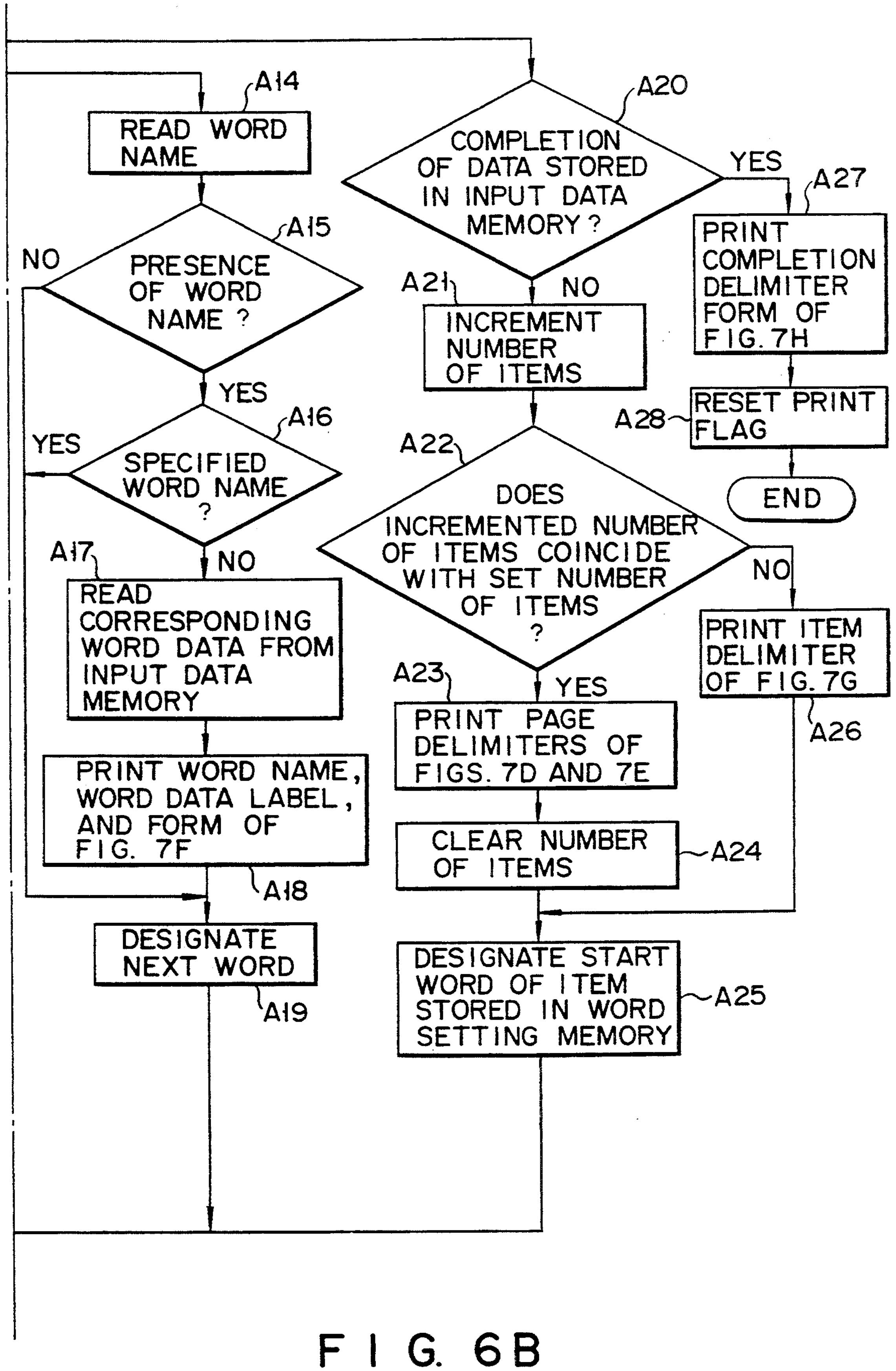

In step S18, section 21 determines whether a print designation flag is set indicating that print key HK has been activated before the data input. If the print designation flag is set in a memory within print processing section 32, section 21 executes step S19. A detailed processing operation of step S19 is shown in FIGS. 6A and 6B and will be described later. The execution of step S19 supplies data stored in input data memory 27 to print section 33 to be printed on a recording sheet. When data stored in transmission data memory 29 in step S17 are transmitted to a host computer, an operator sets mode switch MDSW to the transfer mode. As a result, transmission/receiving section 30 reads data from transmission data memory 29 and transmits the readout data from transmission/receiving section 31 as an optical signal to a host computer.

The operation of step S19 will now be described in detail with reference to FIGS. 6A and 6B.

An execution of a slip printing program causes print processing section 32 to execute an operation according to a flowchart shown in FIGS. 6A and 6B. As a result, a slip as shown in FIG. 8 is printed. Note that FIGS. 7A through 7H show forms of one line of a slip formed by the print processing.

In a flowchart of FIGS. 6A and 6B, print processing section 32 detects, in step A1, set data corresponding to a print-designated slip type, and stored in word set memory 22, and designates an address of the set data. Then, section 32 reads, in step A2, "sales slip", for example. In step A3, section 32 prints a form shown in FIG. 7A, and prints the slip-type name and a form shown in FIG. 7B in the subsequent line. Then, section 32 reads, in step A4, specified word name (for example, "purchaser") and word data (for example, xxx company) corresponding to an address on the slip, from the set data of the designated slip type. Then, section 32 prints, in step A5, the readout specified word name and word data together with the form shown in FIG. 7B in the subsequent line. Furthermore, section 32 reads, in step A6, our address (for example, *** company), and prints them in the subsequent line together with the form shown in FIG. 7B. The above described printing forms three lines including title data and a title within title region X of a sheet as shown in FIG. 8.

Figure 7A:
FIGS. 7A, 7B, 7C, 7D, 7E, 7F, 7G, and 7H are each views each showing a slip form of one line to be printed in the print processing operation.
Figure 7B:
Figure 7C:
Figure 7D:
Figure 7E:
Figure 7F:
Figure 8:
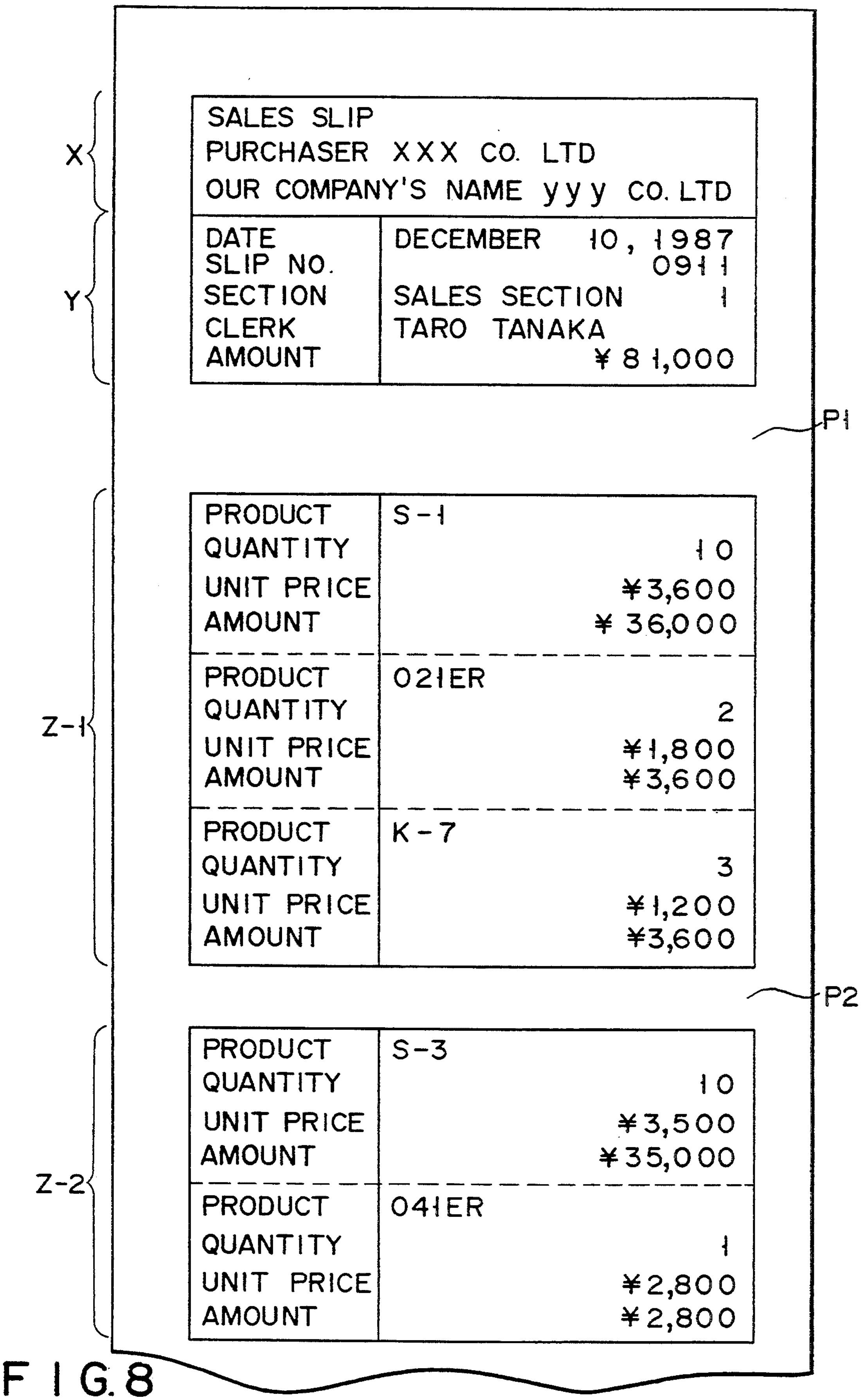
FIG. 8 is a view showing a print example of a slip printed by printing section 33 of the slip data processing apparatus.

Then, section 32 advances to step A8 to print a form shown in FIG. 7C indicating an end of the title form (which also serves as a start of the next header form). In step A9, section 32 designates an address of the start word stored in word setting memory 22, i.e., the start word of the designated slip type. Then, section 32 reads in step A10 word contents corresponding to the designated word from input data memory 27, and checks in step All whether the readout word contents designates a header end, i.e., item start word "I". If the word content is not the header end, section 32 checks, in step A13, whether the word content is item completion word "E". If the word content is not the item completion word, section 32 advances to step A14 to read a word name corresponding to the designated word from word setting memory 22, and checks in step A15 the presence or absence of the description of the word name. As a result, if the word name is described corresponding to the designated word, section 32 checks in step A16 whether the word name is the specified word name of "purchaser". For the first time, section 32 reads a word name of "date", executes steps A15 and A16, and reads, in step A17, word data corresponding to a designated word from input data memory 27. Then, in step A18, section 32 prints the word data together with the word name and the label read out from word setting memory 22, and furthermore prints a form as shown in FIG. 7F. Since the label is not described in the date word, it is not printed. Then, section 32 advances to step A19 to designate an address of the next word stored in input data memory 27, and then returns to step A10.

In step A10, section 32 reads input word "a" from word setting memory 22. In this case, word name "slip No." is described in the designated word. Thus, section 32 prints word data, word name, and the forms, similar to a case as described above. In step A15, section 32 detects that the word corresponding to word No. "03" has no word name to be described, and advances to step A19. Therefore, the word name is not printed. More specifically, the word content in this case is input word "a" which defines to input a purchaser code, and therefore only a purchaser code is stored in the corresponding word stored in input data memory 27. The actual purchaser name is stored in the next word. Therefore, if a word name is preliminarily stored, the printing thereof can be cancelled. In the word corresponding to next word number "04", described is word name "purchaser" (specified word name). In step A16, section 32 detects this, and advances to step A19. Thus, also in this case the word printing is cancelled. More specifically, the "purchaser" is a specified word name, and has already been printed as the title data. Therefore, the word printing is cancelled in order to avoid a double printing.

A similar operation is repeated for each word, thereby printing header data and header form, line-by-line. As a result, as shown in FIG. 8, the header data of five lines are printed together with the header form in header area Y on the sheet.

After completing the header printing as described above, section 32 reads item start word "I" from word setting memory 22 in step A10, and determines it in step A11. Thus, section 32 advances to step A12 to print a page delimiter. More specifically, section 32 prints the page delimiter in order to handle the title data and the header data as one block (one page, for example). In this case, section 32 prints a form having a shape as shown in FIG. 7D, i.e., performs a printing indicating an end of the header form. Then, section 32 performs a line feed to form a one-line space. Then, section 32 prints a form shown in FIG. 7E, i.e., performs a printing for designating a start position of the item. As a result, as shown in FIG. 8, page delimiting portion P1 is formed at the bottom of header area Y. Accordingly, title area X and header area Y of a first page of a slip are printed.

From the second through end pages of the slip are printing areas of item data. In this case, section 32 advances from step A13 to step A14 until a plurality of word data constituting one item are printed. Thus, in steps A10 through A14, section 32 prints item data and word names line-by-line together with the form and the like.

Figure 7G:

Upon completing of printing one item, section 32 advances to step A20 to check whether the above processing is completed for all the data stored in input data memory 27. If NO is determined, section 32 advances to step A21 and increments the item-number counter CT by one. Section 32 compares a value of item-number counter CT with the set item number stored in word setting memory 22 in step A22. Since the one-item printing has been completed at this time, the value of item-number counter CT, and the set item number stored in word setting memory 22 are "1" and "3", respectively. Therefore, section 32 determines in step A22 the noncoincidence between them and advances to step A26 to print an item delimiter. In the item delimiter printing, section 32 prints a form as shown in FIG. 7G. Then, section 32 advances to step A25 to designate the start word of the next item stored in word setting memory 22, and then returns to step A10 to repeat the above operations. As a result, the item delimiter is printed each time the one-item printing is completed. This operation is repeated until the value of item-number counter CT coincides with the set item number "3". As a result of the repetition, three items each comprising four words are printed in item area Z-1 on the sheet, and the delimiter printing is performed for every one item, as shown in FIG. 8.

When the value of item-number counter CT coincides with the set item number, section 32 advances to step A23 to print the page delimiter as described above. For this reason, three items of data are printed in the second page of the slip.

When the second page is printed as described above, section 32 clears the item counter CT in step A24, and thereafter advances to step A25 to perform a same operation as described above. Thus, section 32 repetitively executes steps A20 through A25 until an end of data is detected in step A20. Assume now that five items of data are stored in input data memory 27. In this case, the remaining two items of data are printed in item area Z-2 of the third page of the sheet, as shown in FIG. 8.

Figure 7H:
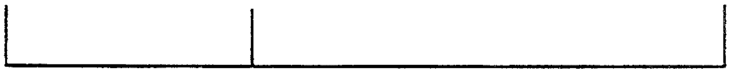

When section 32 determines an end of data in step A20, it advances to step A27 to print a form indicating an end delimiter as shown in FIG. 7H. Then, section 32 resets a print flag in step A28.

In steps A5, A7, and A18, an example has been described wherein the print positions of the word names, the word data, and the like are preliminarily determined by the system.

However, the print positions of the word names and the word data can arbitrarily be specified. In this case, a user preliminarily stores specific data designating print positions of the word names and the word data to be printed, corresponding to the respective words, to thereby arbitrarily set the print format of a slip. The print processing section 30 prints the word names, the word data and the like in accordance with the specific data stored in the memory.

Slips printed on a roll-formed paper can be folded at a boundary of page delimiter portions P1 and P2 of each page. In this case, the number of items stored in word setting memory 22 can arbitrarily be designated by a user. In this case, it is preferable to determine the number of items so that the length of the first page and each of the succeeding pages are almost equal, based on the number of words to be printed in the first page or the number of words of one item.

Note that forms used for the item delimiter printing and the page delimiter printing are not limited to the above embodiments, and various forms may arbitrarily be used unless there are distinctions between them.

As described above, a word name and a word data are printed line-by-line. Therefore, even if the header and the number of words constituting the item differs depending on a user, the printing of a slip in its longitudinal direction and having an arbitrary length, enables printing of a slip having any number of words. As a result, a compact-size printer can be used.

Figure 9:
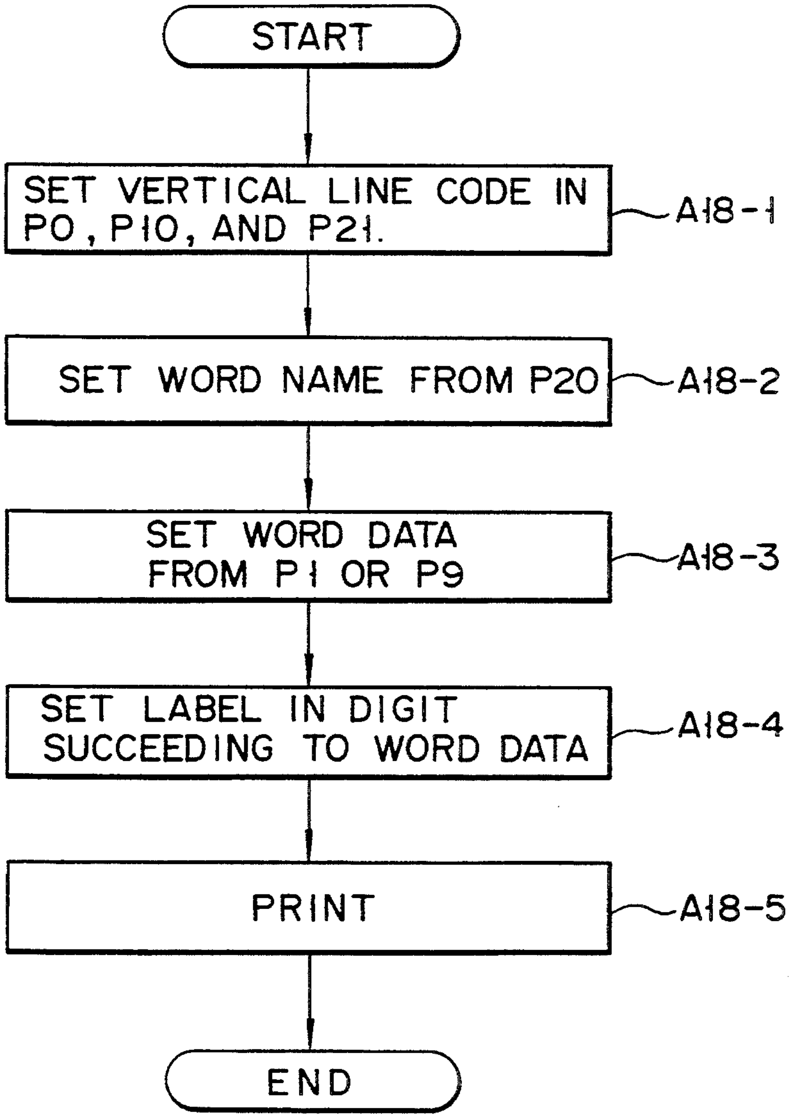
FIG. 9 is a flowchart showing details of the print processing in FIG. 6.
Figure 10:
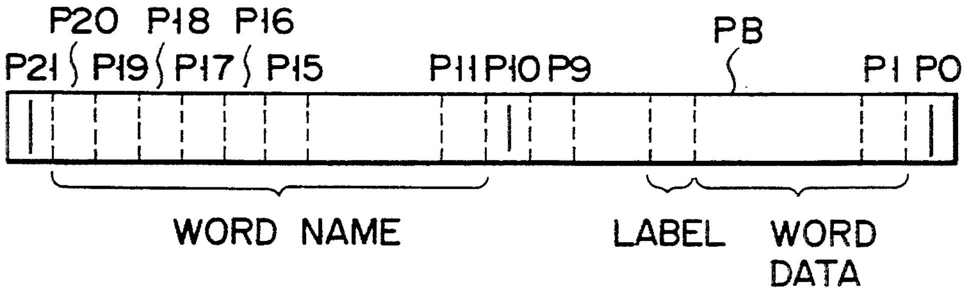
FIG. 10 is a constructional view showing print buffer PB of print processing section 32 of the slip data processing apparatus.

FIG. 9 is a flowchart for explaining a detailed operation of the printing processing (step A18) shown in FIG. 6. FIG. 10 shows an arrangement of print buffer PB provided in print processing section 32.

Print buffer PB comprises an one-line buffer constituted by 22 digits. Digits P0, P10, and P21 store a vertical line code, digits P11 through P20 store a word name, and digits P1 through P9 store word data and an label.

In step A18-1 in FIG. 9, print processing section 32 sets the vertical line codes in digits P0, P10, and P21 of the print buffer PB. Then, section 32 sets, in step A18-2, the word name in digits P1 through P10. Furthermore, section 32 sets, in step A18-3, the word data in digits P1 through P9. When the word data comprises a character string, the word data are sequentially input from an upper digit to a lower digit while the first digit of the character string being aligned with P9. When the word data comprises numeric data, the numeric data are sequentially input from the least significant digit to the most significant digit while the least significant digit being aligned with P1. If the label is present, section 32 sets in step A18-4 the label in the digit next to the word data. After storing data of one line in print buffer PB as described above, section 32 advances to step A18-5 to supply the contents of buffer PB to printing section 33 to print them. As a result, one line of data is printed, including the word name, word data, label, in the form shown in FIG. 7F. In another example, said word data comprising numeric data are sequentially input from an upper digit while the most significant digit of the numeric data string being aligned with P9. If the label is present, section 32 sets in step A18-4 the label in the digit next to the least significant digit of the numeric data.

Figure 11A:
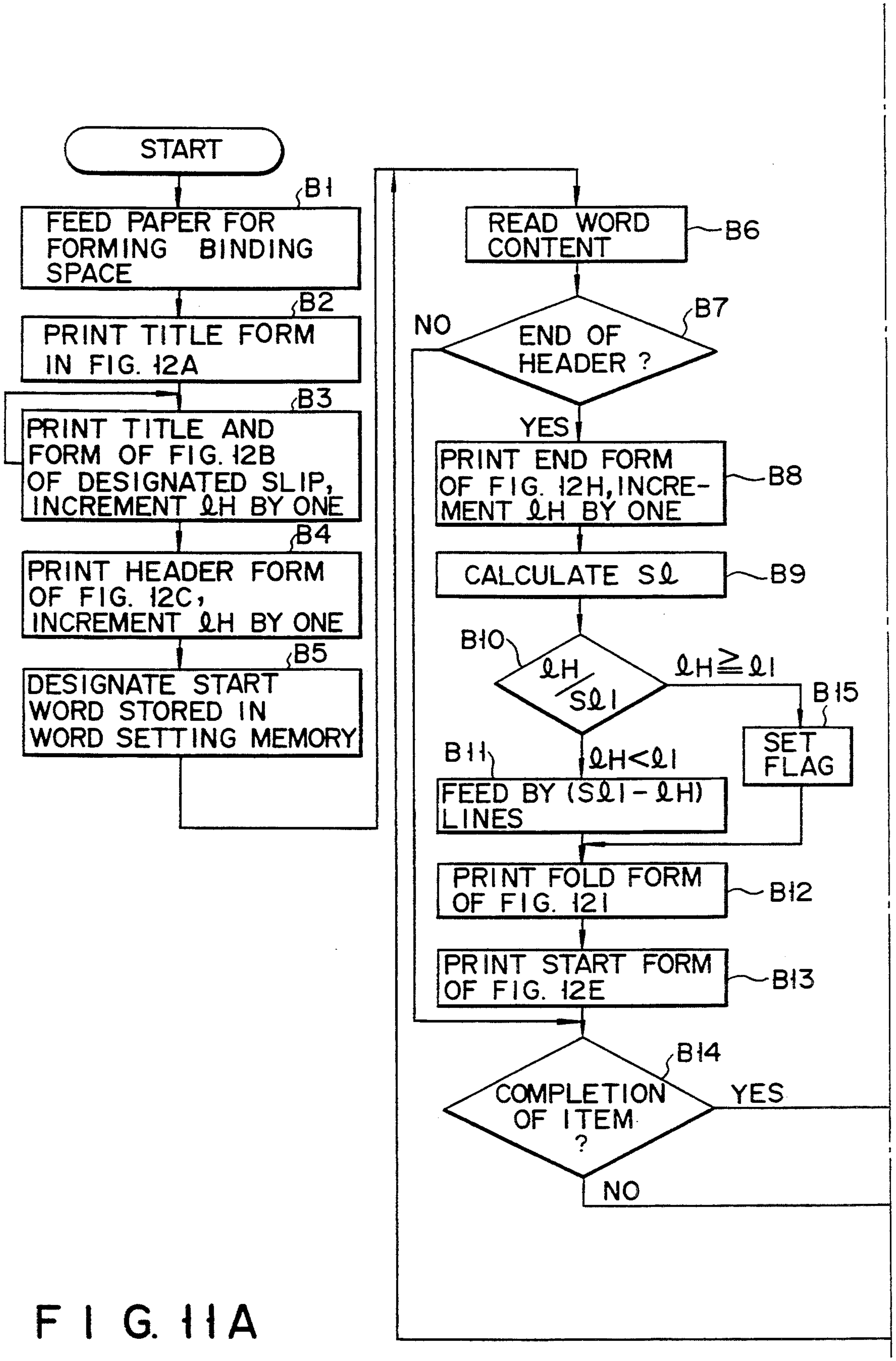
FIGS. 11A, 11B, and 11C together are flowcharts showing another example of the print operation of the slip data processing apparatus.
Figure 11B:
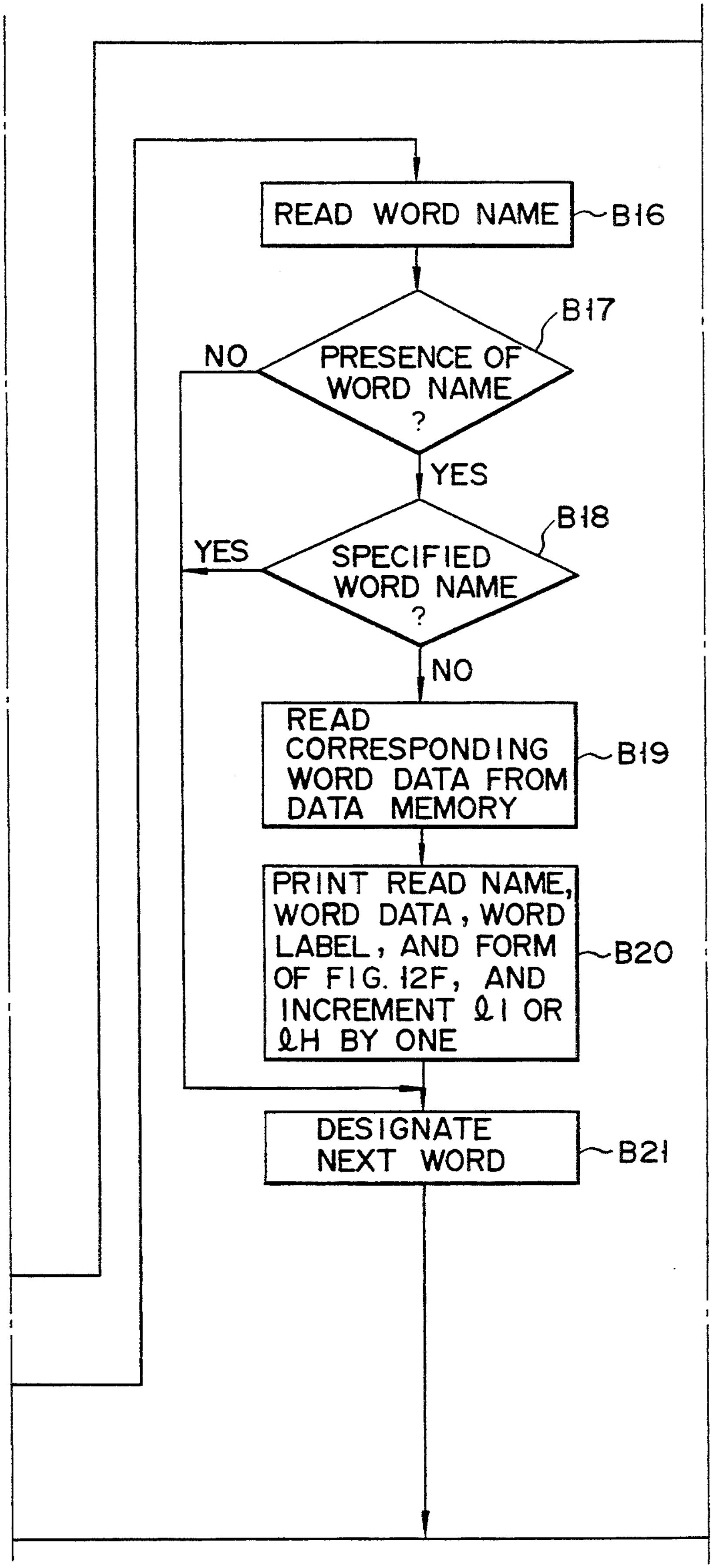
Figure 11C:
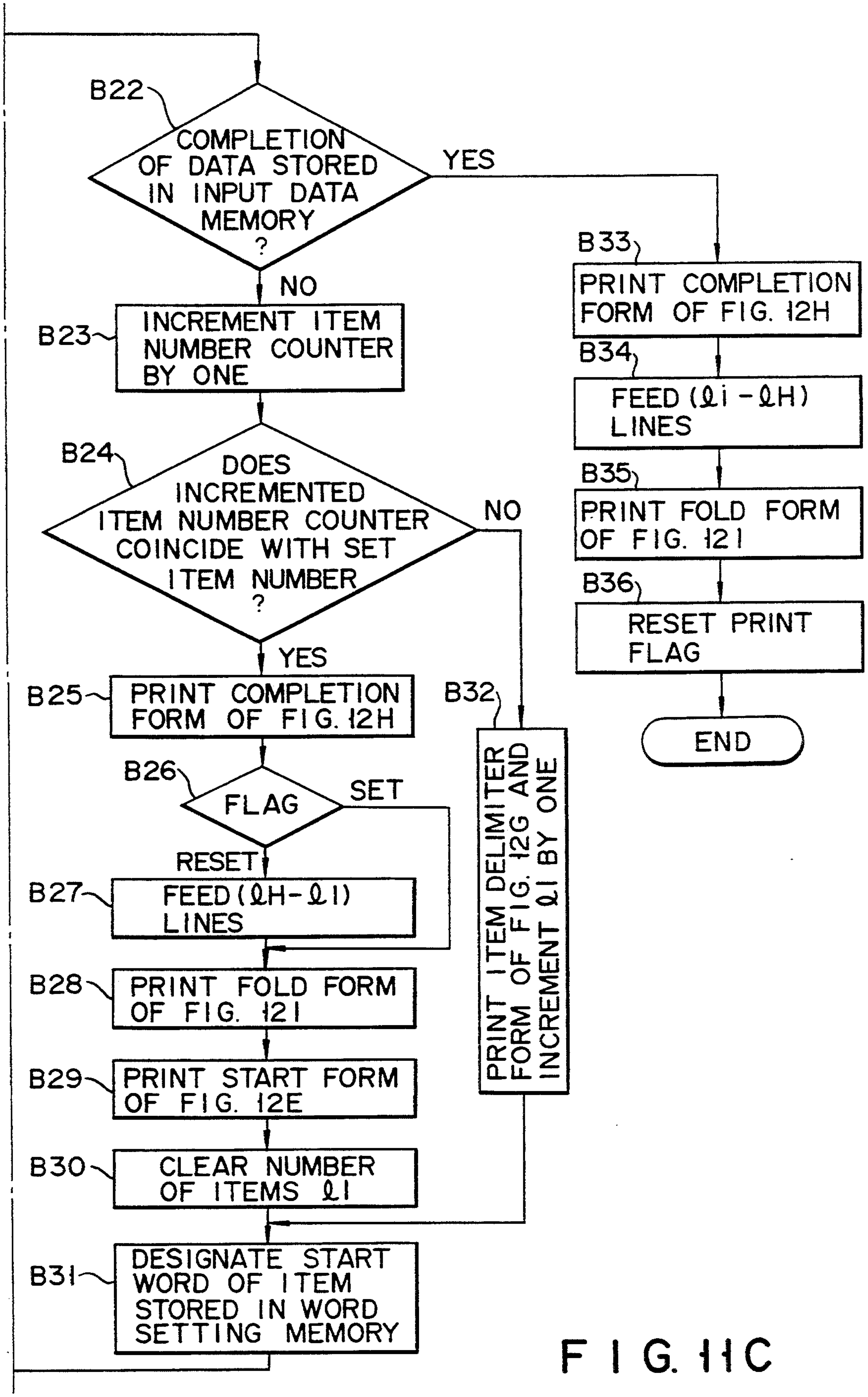

Another example of the print operation in step S19 in FIG. 5 will now be described with reference to a flowchart in FIGS. 11A through 11C. In this example, a printing allocation on a recording sheet is automatically determined depending on the number of items of data. FIGS. 12A through 12I show forms for one line as those in FIG. 7 except that a form indicating a fold shown in FIG. 12I is additionally provided.

Figure 13:
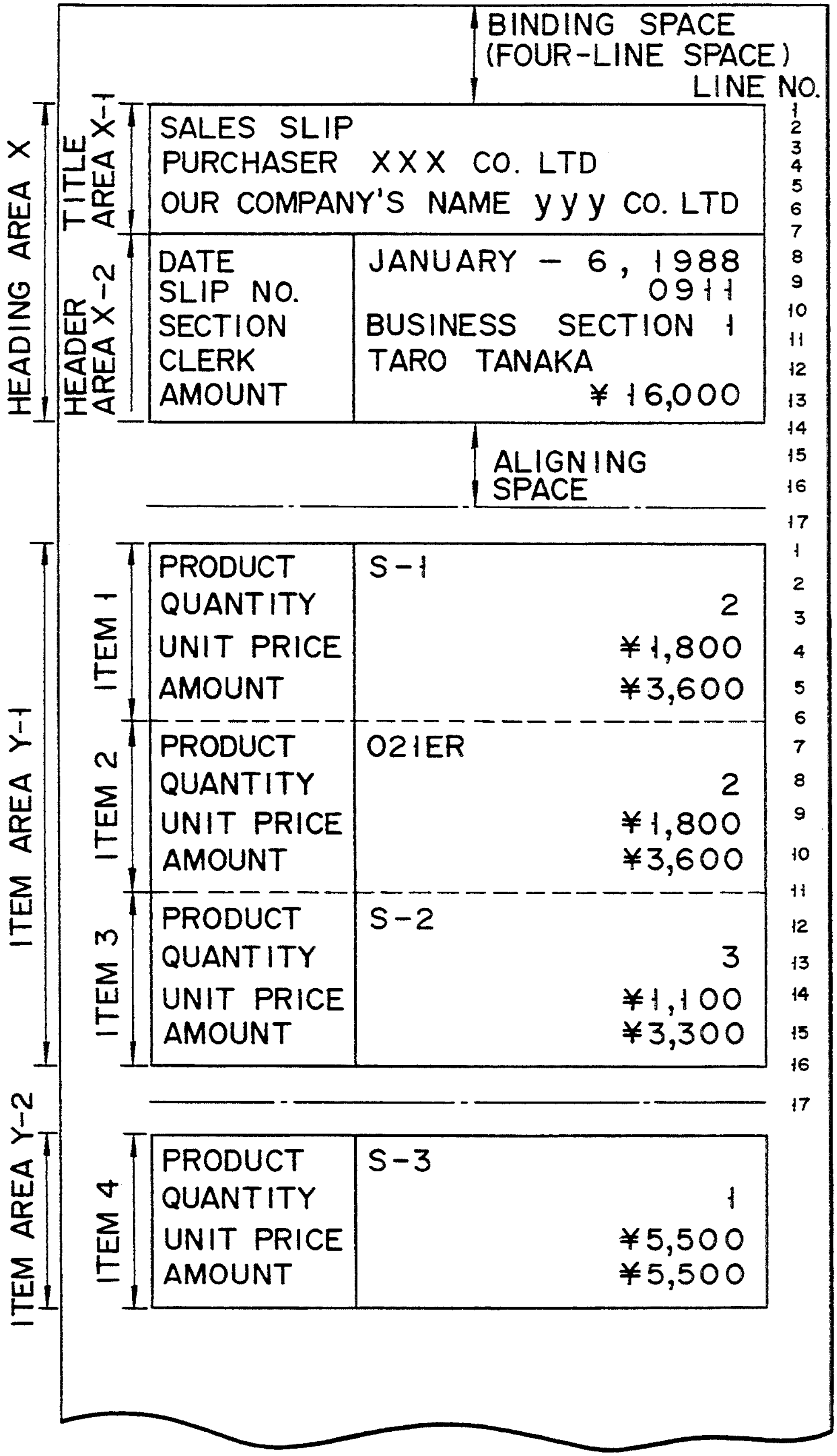
FIG. 13 is a view showing a print example of a slip printed by the print operation in FIG. 11.

First, in step B1, print processing section 32 feeds a sheet by a predetermined number of lines (in this embodiment four lines) in order to form a binding space. Then, section 32 prints, in step B2, a form as shown in FIG. 12A to print a title form. More specifically, section 32 prints a form indicating a start of the title. In step B3, section 32 sequentially prints title data of one word line-by-line as well as forms contiguous to the start of the title form. More specifically, section 32 designates set data stored in word setting memory 22 corresponding to a designated slip type, reads "slip type name" from the set data and prints it together with the form shown in FIG. 12B. Then, section 32 retrieves specified word name "purchaser" from the set data of the specified slip type, reads word data "purchaser name" corresponding to the specified word name, from input data memory 27, and prints the word data, the specified word name, and the form. Furthermore, section 32 reads "our name" from word setting memory 22 and prints it together with the form. As a result, three lines of title data are printed together with the title form on title area X-1 of the sheet, as shown in FIG. 13. In this case, print processing section increments by one line number counter $Z_H$ incorporated therein. Since one word of title data is printed in every other line, the value of counter $l_H$ is "6".

In step B4, section 32 prints an end of title form (which serves also as the start of the next header form), as shown in FIG. 12C. Also in this case, section 32 increments line number counter $l_H$, and therefore, a value thereof becomes "7". In step B5, section 32 designates the start word stored in word setting memory 22, i.e., the start word of the designated slip type. Then, in step B6, section 32 reads the word content corresponding to the designated word from word setting memory 22, and checks, in step B7, whether the readout content indicates an end of header, i.e., item start word "I". If the word content is not the end of header, section 32 advances to step B14. In this case, the word content is not the item completion word "E". Thus, section 32 advances to step B16 to read the word name corresponding to the word content from word setting memory 22, and checks, in step B17, whether the word name has been described. If the word name has been described corresponding to the designated word, section 32 checks, in step B18, whether the word name is the specified word name of "purchaser" above described. Since word name of "date" is read out first, both determinations in steps B17 and B18 are affirmative, section 32 checks, in step B19, the word data corresponding to a specified word from input data memory 27, and prints, in step B20, the readout word data together with the word name read out from word setting memory 22 and the label. Furthermore, section 32 prints a form shown in FIG. 7F. Section 32 Increments line number counter $l_H$ by one and thus, a value thereof becomes "8". Since in this case the label is not described, the printing thereof is not performed. Then, section 32 advances to step B21, to designate the next word, and then returns to step B6.

In step B6, section 32 reads input word "a" from word setting memory 22. In this case, since word name "slip-type No." is described in the designated word, section 32 prints the word data, word name, and the field framing line.

Then, a word corresponding to word number "03" is designated. In this case, the word name is not described. Section 32 detects it in step B17 and advances to step B21. Therefore, the word is not printed. More specifically, the word contents in this case is an input word "a" which defines an input of the purchaser code. Thus, only the purchaser code is stored in a correspondence word stored in input data memory 27, and actual purchaser name is stored in the succeeding word. In this case, if the word name is not preliminarily described, the printing thereof can be canceled. In a word corresponding to word number "04", word name "purchaser" (specified word name) is described. In this case, section 32 detects it in step B18 and advances to step B21. Thus, also in this case, the word printing is canceled. More specifically, the "purchaser" is a specified word name and has already been printed as the title data. Thus, in order to avoid printing it twice, the printing of the "purchaser" of the second occurrence is canceled.

A similar operation is sequentially repeated word-by-word to print the header data and the header form line-by-line. As a result, five lines of word data are printed in header area X-2 as shown in FIG. 13. At this time, line number counter $l_H$ becomes "12".

As described above, when the printing of header area X-2 is completed, section 32 reads item start word "I" from word setting memory 22. Section 32 detects it in step B7 and advances to step B8 to print an end of header as shown in FIG. 12H. At this time, a value of line number counter $l_H$ is incremented by one and becomes "13". The value of line number counter $l_H$ represents a number of lines obtained by summing up the lines constituting header area X-1 and X-2 (hereinafter to be referred to as heading area X). Therefore, line number counter $l_H$ is used as the line number counter for the heading area.

As described above, when section 32 completes printing of the heading area X, it calculates a number of items S in step B9. More specifically, section 32 refers to the number of items stored in word setting memory 22, and calculates the number of words to be printed among words corresponding to a number of the set items, by deretrieving the contents of input data memory 27. The number of set items is "3", and the number of words to be printed is four per item. Thus, the total number of words to be printed amounts to 12. Thus, section 32 calculates the number of item lines $Sl_I$ by adding the number of lines "4" (the number of items plus a line in which an item form is printed to be described later) to the number of words. Then, section 32 compares the item line number $Sl_I$ with the line number $l_H$ in step B10. At this time, item line number $Sl_I$ and line number $l_H$ are "16" and "13". Thus, section 32 feeds a sheet by an amount of $(Sl_I - l_H)$ lines (three lines) in step B1, and prints the fold line in step B12. Thus, a space of three lines is formed at the bottom of heading area X, and a horizontal line as shown in FIG. 12I is printed as the folding portion of the sheet. By printing the folding line or portion, a first page (heading area X) of the slip is defined. In this case, in order align the length of the first page with that of a second page, a space for aligning the length is formed at the bottom of heading area X.

On the other hand, when section 32 detects, in step B10, line number counter $l_H \geqq$ item line number $Sl_I$, the space for aligning the length is not formed at the bottom of heading area X. Section 32 sets "1" in a flag register incorporated therein in step B15, and prints the fold line in step B12.

Then, section 32 advances to step B13 to print the item start form as shown in FIG. 12E. Then, section 32 checks in step B14 whether all the items are processed. Since item start word "I" is read out, section 32 advances to step B16 to read the word name. Then, section 32 prints, in step B20, item data, word name, and item form word-by-word as described above. In this case, section 32 increments line number counter $l_I$ by one each time it prints one word of item data.

When section 32 completes printing of one item, it reads item completion word "E" from word setting memory 22. Section 32 detects it in step B14, and advances to step B22 to check whether the above described operation is performed for all the data stored in input data memory 27. If NO is determined in step B22, section 32 advances to step B23 to increment item number counter IC incorporated therein by one. Then, section 32 compares, in step B24, a value of item number counter IC with the number of items stored in word setting memory 22. Since printing for one item is completed now, the value of item number counter IC is "1", and the set item number stored in word setting memory 22 is "3". Accordingly, section 32 detects noncoincidence between them, and advances to step B32 to print the item delimiter as shown in FIG. 12G. In this case, section 32 increments line number counter $l_I$ by one. Then, section 32 advances to step B31 to designate the start word of the succeeding item stored in word setting memory 22. Then, section 32 returns to step B6 and repeats the above described operation. As a result, each time printing of one item is completed, the item delimiter is printed. Such operation is repeated until the value of item number counter IC coincides with the set item number "3". As a result, as shown in FIG. 13, three items each comprising four words are printed, and an item delimiter is printed for every item. Simultaneously, the line number counter $l_I$ is updated to become "16".

When the value of item number counter IC coincides with the set item number, section 32 advances to step B25 to print an end of item as shown in FIG. 12. Then, section 32 checks, in step B26, whether "1" is set in the flag register. As described above, when section 32 detects, in step B10, line number counter $l_H \geqq$ item line number $Sl_I$, it sets "1" in the flag register. Accordingly, in this case, section 32 advances to step B27 to feed the sheet by $(l_H - Sl_I)$ lines, and prints the fold line in step B28. By printing the fold line, the second page of the slip is defined. The paper feed is performed in order to align the length of the second page with that of the first page. In this case, line number counter $l_H$ and item line number $Sl_I$ are "13" and "16", respectively. Accordingly, section 32 detects, in step B26, that "1" is not set in the flag register, and prints the fold line without performing the paper feed, in step B28. FIG. 13 shows an example of the printed fold line. The second page of the slip constitutes item area Y in which items 1, 2, and 3 are sequentially printed, and a space for length aligning is not formed at the bottom of item area Y.

As described above, when section 32 prints the second page, it advances to step B29 to print a start of item form as shown in FIG. 12E. Then, section 32 clears item line number counter IC and line number counter $l_I$ in step B30. Thereafter, section 32 advances to step B31 and repeats steps B6 through B31 until it detects an end of data in step B22. As a result, as shown in FIG. 13, the remaining one item data (data of item 4) is printed in item area Y-2 of the third page. When section 32 detects an end of data in step B22, it advances to step B33 to print the end of item form as shown in FIG. 12H. Then, section 32 feeds a paper by $(l_H - l_I)$ lines in step B34. Since line number counter $l_H$ and line number counter $l_I$ are "16" and "6", respectively, section 32 feeds a paper by 10 lines to form a length aligning space at the bottom of item area Y-2. Then, section 32 advances to step B35 to print the fold line as shown in FIG. 12I, and resets the flag in step B36.

Figure 14:
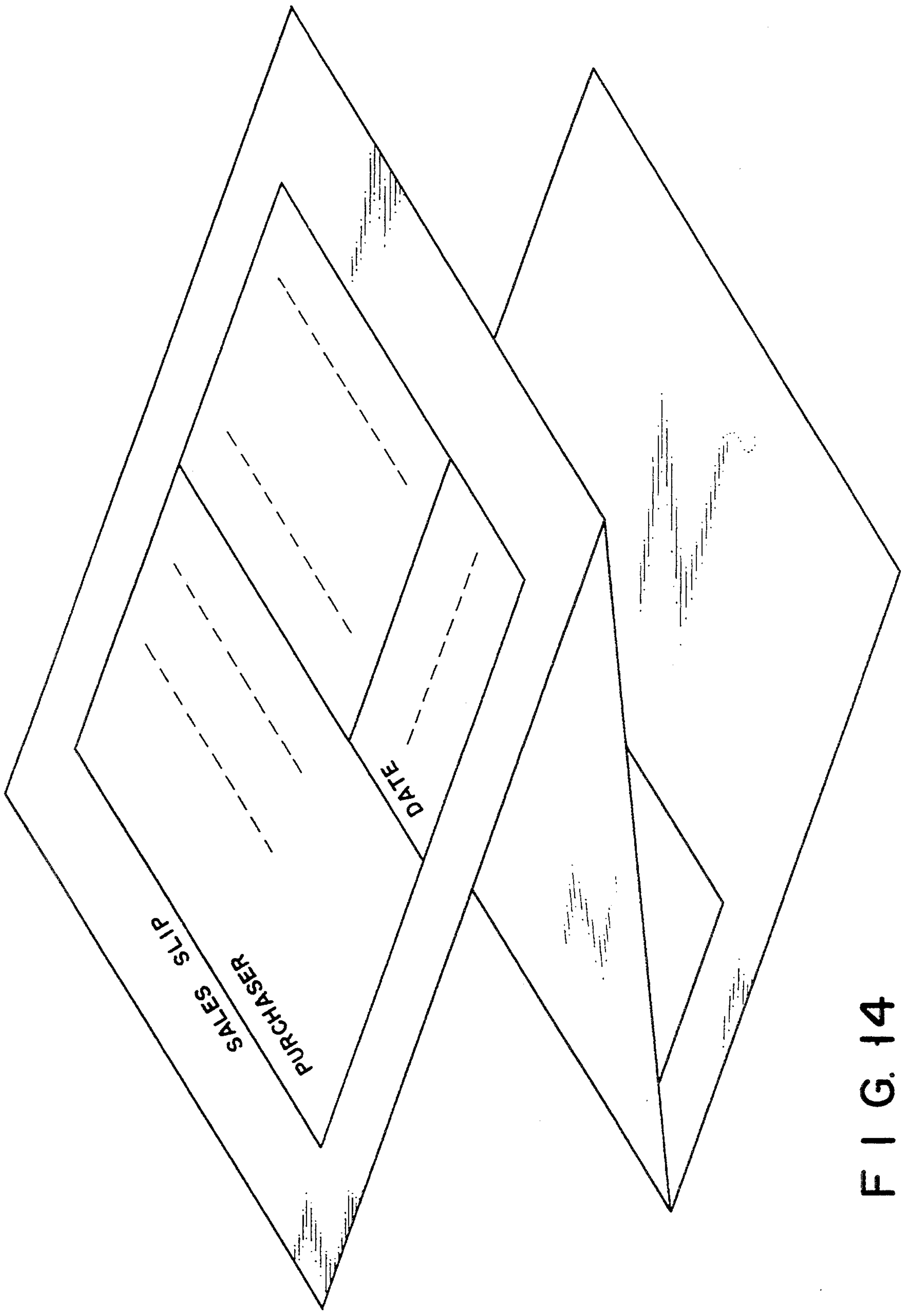
FIG. 14 is a view showing a slip in FIG. 13 in a folded condition.

The roll-formed paper printed as described above can be folded at the boundary of the fold printing portion (i.e., at the fold line). In this case, as shown in FIG. 14, the fold printing portion of the top of the first page and the fold printing portion of the bottom of the third page are separated. Then, the sheet is folded at the fold portion between the first and second page, and at the fold portion between the second and third pages. Then, the binding in portion formed on the top of the first page is bound by a binder or the like, thereby achieving easy handling and managing of the slips.

In the above embodiment, three pages are printed. However, a slip of four pages or more can be printed, depending on the number of items.

What is claimed is:

1. A slip defining and printing apparatus for defining a slip having an arbitrary number of words and printing the slip in accordance with the definition without a user programming, said apparatus comprising:

slip defining means for, in a slip defining mode, key-inputting by user a plurality of slip names and for key-inputting by user for each slip name a variable number of word names, said word names defining a slip identified by said slip name;

word name storage means for, in the slip defining mode, storing the slip name and the word names defined by said slip defining means in correspondence with the slip name;

slip designating means responsive to a user selection of a particular slip name for, in a slip data entry mode, activating a control means, to thereby read each word name in the slip corresponding to said selected particular slip name;

control means for reading out and displaying the respective word names of the slip corresponding to the selected particular slip name from said word name storage means;

word data input means for, in the slip data entry mode, inputting the word data as a value for the respective read-out word names after the word names have been defined in the slip defining mode;

word data storage means for, in the slip data entry mode, storing the word data input by said word data input means; and slip data print means for, in a print mode, printing, after all the word data have been input by said word data input means, the slip name, and an elongated slip in which the word names stored in said word name storage means corresponding to the slip name, and the word data read out from said word data storage means corresponding to the word names are arranged in units of rows, the elongated slip being tailored to the number of word names.

2. The apparatus according to claim 1, wherein the length of a slip is variable as a function of the number of word names on an outputted slip.

3. The apparatus according to claim 1, wherein said word name and word data are printed on the same row of an outputted slip.

4. A slip defining and printing apparatus for defining a slip having an arbitrary number of words in accordance with a definition, for printing the slip in accordance with the definition without a user programming, and for arbitrarily designating printing of word data depending on a presence or absence, in said definition, of word names, said apparatus comprising:

slip defining means for, in a slip defining mode, key-inputting by user a plurality of slip names and for key-inputting by user for each slip name a variable number of word contents and word names designating whether or not the word data are printed, said word contents defining a word for which word data is to be input or a word to be generated based on other word data;

slip storage means for, in the slip defining mode, storing the slip name, the word contents and the word names defined by said slip defining means;

slip designating means responsive to a user selection of a particular slip name for, in a slip data entry mode, activating a control means, to thereby read each word contents and each word name inputted for said slip name;

means for reading out and displaying the respective word contents and the respective word names of the slip corresponding to the selected particular slip name from said word storage means;

word data input means for, in the slip data entry mode, inputting the word data as a value for the respective read-out word names after the word names have been defined, wherein the control means thereby generate new word data based on the word data and in accordance with the read out word contents;

word data storage means for, in the slip data entry mode, storing the word data input by said word data input means; and slip print means for, in a print mode, printing the slip after all the word data have been input, and for detecting, prior to the printing of the slip, whether or not word names are stored in said slip storage means corresponding to the slip name to be printed, for reading out the word data corresponding to the word names if stored, and for printing a slip in which the slip name, word data and the corresponding word names are arranged on the slip.

5. The apparatus according to claim 4, wherein the length of a slip is variable as a function of the number of word names on an outputted slip.

6. The apparatus according to claim 4, wherein said word name and word data are printed on the same row of an outputted slip.

* * * * *